(No Model.) 3 Sheets—Sheet 1.
A. A. & L. A. APPERT.
APPARATUS FOR THE APPLICATION OF COMPRESSED AIR TO THE MANUFACTURE OF GLASS.
No. 292,730. Patented Jan. 29, 1884.
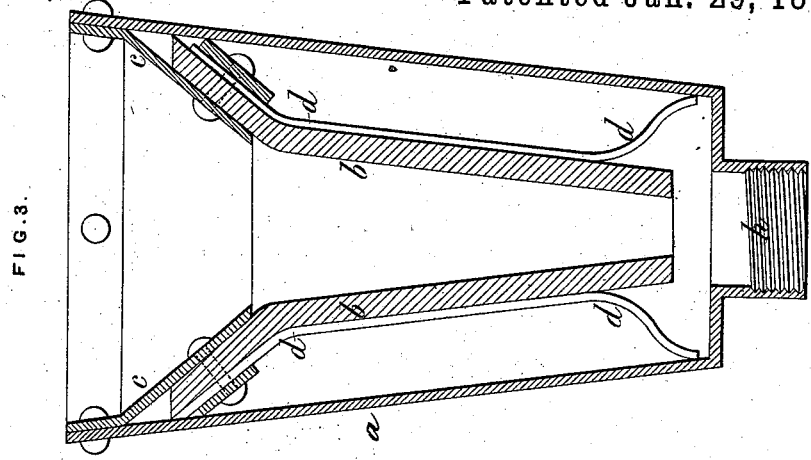
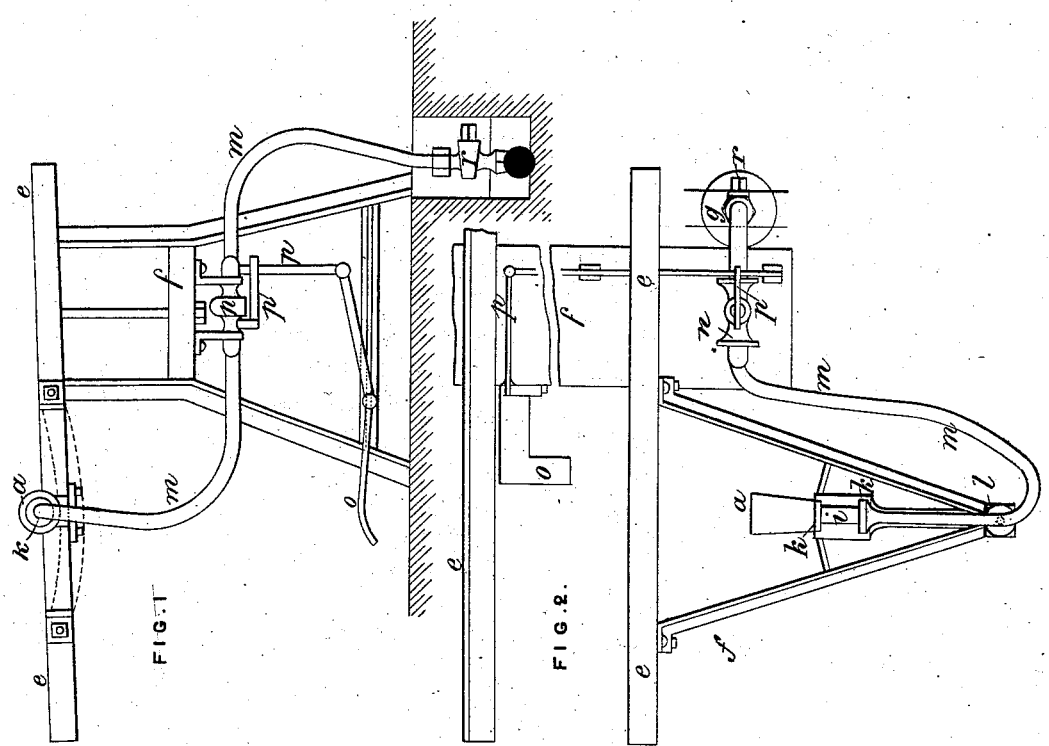
Witnesses:
Theo. G. Hoster
C. Sedgwick
Inventor:
A. A. Appert
L. A. Appert
By Munn & Co
Attys.

(No Model.)  3 Sheets—Sheet 2.

A. A. & L. A. APPERT.
APPARATUS FOR THE APPLICATION OF COMPRESSED AIR TO THE MANUFACTURE OF GLASS.

No. 292,730.  Patented Jan. 29, 1884.

Witnesses:
Theo. G. Hoster
C. Sedgwick

Inventor:
A. A. Appert
L. A. Appert

By Munn & Co
Attys.

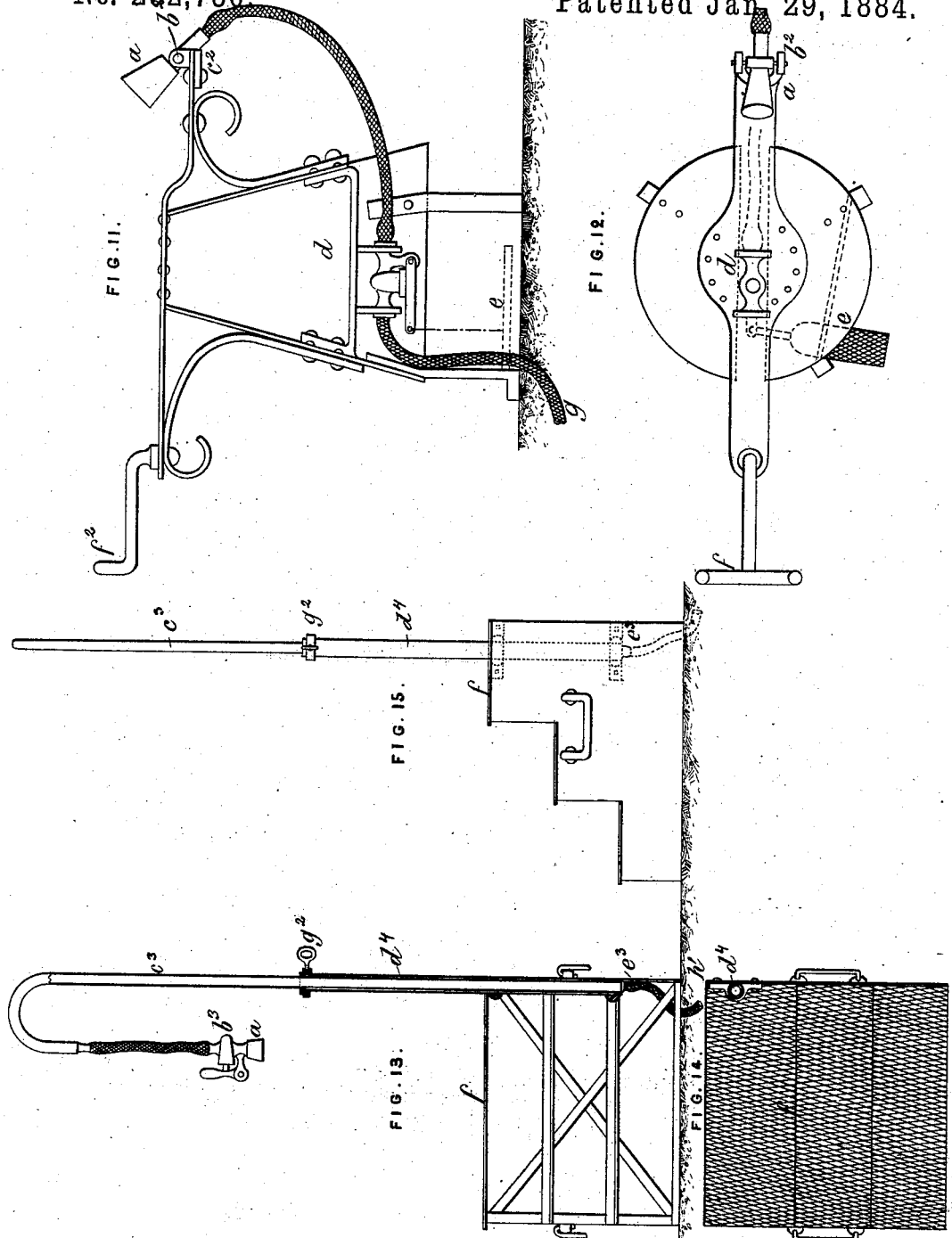

UNITED STATES PATENT OFFICE.

ADRIEN ANTOINE APPERT AND LÉON ALFRED APPERT, OF PARIS, FRANCE.

APPARATUS FOR THE APPLICATION OF COMPRESSED AIR TO THE MANUFACTURE OF GLASS.

SPECIFICATION forming part of Letters Patent No. 292,730, dated January 29, 1884.

Application filed October 13, 1883. (No model.) Patented in France June 3, 1882, No. 149,370, and in Belgium June 24, 1882, No. 58,294.

*To all whom it may concern:*

Be it known that we, ADRIEN ANTOINE APPERT and LÉON ALFRED APPERT, of Paris, France, have invented a new and useful System of Apparatus for the Application of Compressed Air to the Manufacture of Glass, of which the following is a full, clear, and exact description.

The object of our invention is to provide a system of apparatus that may be adapted to the goblet-maker's chair as at present employed in crystal and glass works, and which will permit of compressed air being applied mechanically to the blowing of all kinds of crystal and glass worked at the said chair. This compressed air thus replaces the mouth-blowing of the glass-worker or his assistants. We, besides, utilize the escape and expansion of the compressed air for the cooling of the glass in course of being manufactured, and of the metal or other molds employed for the manufacture of pieces in glass of all shapes and dimensions molded by blowing or by the press. This process has the advantage of facilitating the manufacture and of saving the molds at the same time that it allows of their number being reduced.

In order that we may be better understood, we have represented in the annexed drawings, as a specimen, different views of our system of apparatus arranged upon the ordinary chairs of the glass goblet or tumbler worker.

Figure 5:
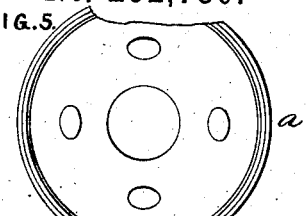
Figure 4:
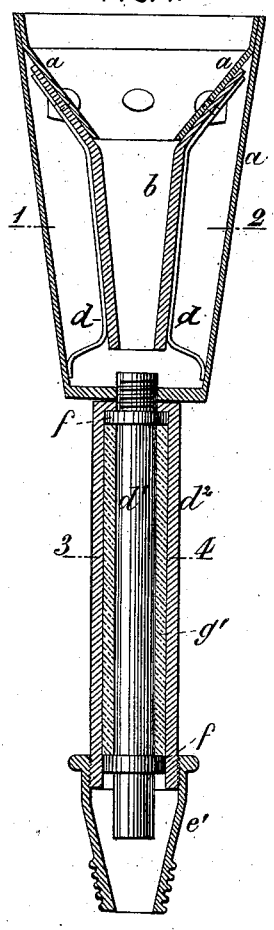
Figure 8:
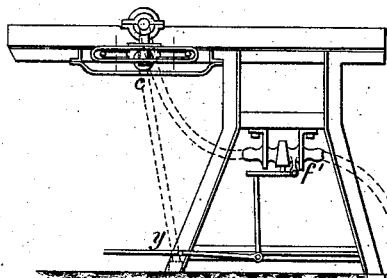
Figure 10:
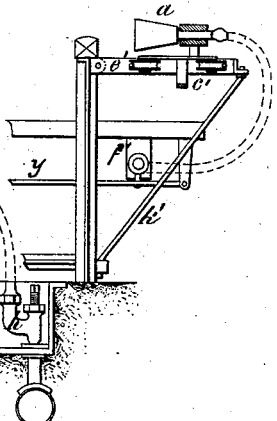
Figure 9:
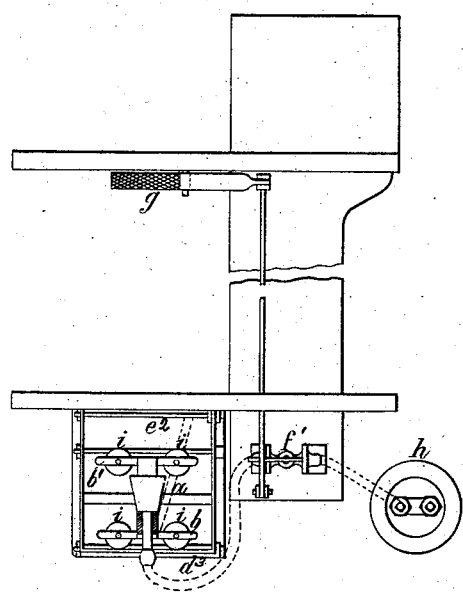
Figure 6:
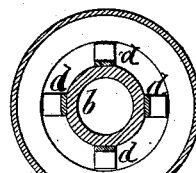
Figure 7:

Figure 1 represents an elevation, and Fig. 2 a plan, of the chair provided with the blowing apparatus. Fig. 3 represents on a larger scale a section through the center line of the blowing-sleeve. Fig. 4 represents a vertical section of a modified arrangement of blowing-sleeve. Fig. 5 is a plan of same. Figs. 6 and 7 are sections of the same on lines 1, 2, and 3, 4 of Fig. 4. Figs. 8, 9, and 10 respectively represent in elevation, plan, and vertical section the new arrangement of the goblet-maker's chair in the case of the modified blowing-sleeve represented in Figs. 4, 5, 6, and 7 being employed. Figs. 11 and 12 show a modified arrangement of the chair for the manufacture of certain pieces requiring an approximately-vertical position of the blow-pipe, the piece to be obtained being placed above the blowing-sleeve. Figs. 13, 14, and 15 represent, respectively, a front view, a plan, and side view of an arrangement of movable apparatus for mold-blowing.

The apparatus invented by us (represented in Figs. 1, 2, and 3,) consists, first, in a metallic blowing-sleeve, $a$, slightly conic, containing in the interior a cone in india-rubber or gutta-percha, $b$, open at the two ends, and forming one with the metallic blow-pipe at the upper part, upon which it is clipped by a riveted metal ring, $c$. The lower part (which is of the smallest diameter) of the cone $b$ is free, and the cone is shorter than the metal blowing-sleeve, which it does not touch. It is supported at the outside by four springs, $d$, supporting it in its length, and at the same time leaving it its elasticity. The pressure of the air being blown in, acting upon the outside of this piece $b$, tends to compress it upon the blowing-tube, which is introduced into it, and to produce an air-tight joint between the elastic cone and the blowing-tube. The workman fixes the blowing-tube in the blowing-sleeve firmly enough to cause it to turn with it in its movement of rotation and to-and-fro movement upon the arms $e$ of the glass-maker's chair $f$. In order that these two movements may be effected, the metallic blowing-sleeve has screwed upon its bottom by a joint, $h$, a hollow tube, $i$, supported by a carriage, itself provided with two pieces, $k$, arranged at a right angle, and in which can turn the sleeve, carrying the blow-pipe around a center in the same right line at the axis of the cam. The carriage itself has a horizontal to-and-fro movement around a vertical axis, $l$, placed behind. It can thus follow the to-and-fro movement of the cam on the arms of the chair. The whole is supported by the left arm of the chair outside, to which it is rigidly fixed. The free end of the blowing-sleeve $a$ is connected by the tube $i$, and by an india-rubber tube, $m$, with a metal tap, $n$, which shuts automatically, placed under the glass-maker's chair, and is worked by the workman's foot by the aid of two pivoted levers, $p$. In acting upon the pedal the workman thus opens the tap $n$ the amount required. This tap is in communication by its other extremity with an air-suction, $g$, provided with a stop-tap, $r$, connected with a reservoir of compressed air in any convenient manner, in which a constant pressure is maintained by means of a regulator.

In Figs. 4, 5, 6, and 7, which represent another arrangement of blowing-sleeve for carrying out our invention, the metallic blowing-sleeve $a$ is composed of an india-rubber cone, $b$, supported by steel springs $d$. The said blowing-sleeve is mounted upon a hollow iron tube, $d'$, upon which is arranged, in such a manner as to turn freely, a second hollow iron tube, $d^2$, which is fixed. The interior tube, $d'$, has two base-rings, $f$, of which the diameter is equal to the interior diameter of the tube $d^2$, thus forming an annular space that we fill with cotton-waste or sooty matter $g'$. The flexible conduit for the compressed air is fitted upon the bronze nipple $e'$, but the cotton-waste $g'$ forms an air-tight fitting, so that our arrangement allows the blowing-sleeve to turn without there being any fear of loss of pressure. Upon the glass-maker's chair, Figs. 8, 9, and 10, rests the carriage $b'$, carrying the gripping blowing-sleeve $a$, which turns round its axis. This carriage $b'$ is carried by a roller, $c'$, running upon a steel rail or horizontal transverse piece. It is guided in its movement of translation by the groove-rollers $i$, working upon the frame $d^3$, turning freely round its axis $e^2$. These rollers $i$ allow the system to resist the transverse strains produced by the workman in introducing the blowing-tube into the blowing-sleeve. The said rollers $i$ roll upon two parallel rods, and the whole of the system—blowing-sleeve carriage and rollers—is carried by the frame $d^3$, which is fixed on the left arm of the chair by the intermediary of the axis $e^2$, around which it turns, and which allows it to be lowered when the workman does not want to make use of it. A movable gallows, $k'$, supports this frame when it is to be employed.

$f'$ is the expansion-cock, opened by the pedal $y$, and $h$ is the air-suction tube.

In the arrangement represented in Figs. 11 and 12 the blow-pipe $a$, instead of being carried upon a carriage which allows it to have a movement of translation, is mounted upon a horizontal pivot, $b^2$, upon which it rocks, this pivot $b^2$ being carried by a support, itself pivoted on an axis or pivot, $c^2$. A fork, $f^2$, is arranged for receiving the end of the blowing-tube when not in use. The other parts of this bench for blowing upward are the same as those described for the arrangement of chair above described.

In the arrangement represented in Figs. 13, 14, and 15 the chair is transformed into a stepped stool, $f$, carrying a curved pipe, $c^3$, by which the compressed air is brought to the hand expansion-cock $b^3$ by the intermediary of a flexible tube. The swan's-neck piece $c^3$ is movable in the tube-guide $d^5$, and is maintained in place by the set-screw $g^2$. An oval piece, $e^3$, serves for fixing the end of the flexible tube, of which the other end is placed to the air-suction $h$. The blowing-sleeve $a$ is fixed upon the expansion-cock $b^3$, which shuts automatically, and which the workman places on the blowing-tube and is thus enabled to regulate the supply of air by hand.

The blowing process, of which we have just described various arrangements, produces a more regular and rapid work than the ordinary manner of working. It has, besides, the advantage of avoiding fatigue to the workman and to the child that helps him. It even allows this last to be altogether dispensed with, which is an advantage to the manufacturer.

In order to apply compressed air mechanically to the cooling of the glass and molds of all kinds, metallic or not, the apparatus that we prefer to employ is composed of a jet provided with a cock connected to an india-rubber tube sufficiently long to allow one to move about and fetch the glass on the mold from the spot where they may have been placed. The tube communicates itself with a reservoir of air compressed mechanically and at a sufficient pressure.

The molds are cooled by our process without deterioration and less abruptly, although with greater rapidity, which allows these molds to be employed a greater number of times during a same period of time, and also effects a considerable saving in cost.

The operation is as follows: Having placed the blowing-tube in the sleeve $a$, and everything being in readiness, the workman depresses the treadle $o$, thereby opening the tap $n$, which is in communication with an air-reservoir, and permitting the air to pass from said reservoir to and through the blowing-tube, the carriage which supports the sleeve and blowing-tube, being in the meantime given a rotary and to-and-fro movement on the arm of the chair.

We claim—

1. In a glass-blowing apparatus, the combination, with a glass-maker's chair and a compressed-air reservoir, of a blowing-sleeve mounted on a carriage having a horizontal movement on the arm of said chair, a pipe connecting said sleeve with the reservoir, and a valve in said pipe for regulating the supply of air to the blowing-sleeve, substantially as herein shown and described.

2. In a glass-blowing apparatus, the combination, with the blowing-sleeve, of the yielding tube $b$, secured within said sleeve, substantially as herein shown and described.

3. In a glass-blowing apparatus, the combination, with the blowing-sleeve $a$, having the yielding tube $b$ secured therein, of a hollow tube connected to said sleeve, and a carriage upon which said tube is supported, having a horizontal to-and-fro movement, substantially as herein shown and described.

4. In a glass-blowing apparatus, the combination, with the sleeve $a$, having the yielding-tube $b$ secured therein, of the tube $i$, the carriage $k$, and the vertical axis $l$, to which the carriage is connected, substantially as herein shown and described.

5. In a glass-blowing apparatus, the combination, with a blowing-sleeve and a compressed-air reservoir, of a pipe connecting said sleeve and reservoir, the tap $n$ in said pipe, the levers $p$, and treadle $o$, substantially as herein shown and described.

The foregoing specification of our system of apparatus for the application of compressed air to the manufacture of glass signed by us this 13th day of September, 1883.

ADRIEN ANTOINE APPERT.
  LÉON ALFRED APPERT.

Witnesses:
 ROBT. M. HOOPER,
 LEON VAUL AUGUSTE VRUGUIER.